March 17, 1964   F. R. GRUNER ETAL   3,125,515
FILTER
Filed March 25, 1959

INVENTORS
FREDERICK R. GRUNER
JAMES D. ABELES
BY Lawrence J. Winter
ATTORNEY

United States Patent Office 3,125,515
Patented Mar. 17, 1964

3,125,515
FILTER
Frederick R. Gruner, Westfield, and James D. Abeles, Mendham, N.J., assignors to Purolator Products, Inc., Rahway, N.J., a corporation of Delaware
Filed Mar. 25, 1959, Ser. No. 801,808
1 Claim. (Cl. 210—493)

The present invention relates to a filter and more particularly to a full flow filter.

It is common practice in present day internal combustion engines to clean the lubricating oil by passing the total oil flow through a full flow filter during operation of the engine. In the past, only a small portion of oil at a time was channeled through the filter while the remaining portion of the oil was continuously recirculated from the engine crankcase to the parts to be lubricated without filtering. Eventually, all of the oil was progressively filtered as sooner or later the portion which by-passed the filter previously would be passed therethrough. With the advent of more high power engines, the provision of the full flow filter in the lubrication system of an internal combustion engine has followed since it is now necessary to attain a high degree of filtration due to closer engine tolerance requirements if the engine parts are not to be subjected to excessive wear.

One difficulty encountered in flowing all of the lubricating oil from the crankcase through the full flow filter is that the filter paper used in such a filter is of such high efficiency that when the engine is cold and the lubricating oil is viscous the high efficiency filter will not permit sufficient oil to pass therethrough for proper lubrication of the engine. Accordingly, a by-pass relief valve is provided in the system which will open to prevent the engine from being starved of oil. However, this solution to the problem permits unfiltered cold oil to pass therethrough to lubricate the necessary parts of the engine. Also, the high efficiency full flow filter paper does not have as long a life expectancy as a more coarse filter before a predetermined allowable pressure drop across it is reached and, consequently, it will need more frequent replacement thereof.

An object of the present invention is to provide a method and apparatus for filtering the entire flow of the lubricating oil of an internal combustion engine while providing a good balance of life and efficiency in the full flow filter element. This is accomplished by providing a filter element having different flow rates therethrough which permits full flow filtration of the oil during cold starting of the engine while increasing the useful life of the filter element and avoiding the above-mentioned difficulties.

An object of the present invention is to provide a full flow filter element having different flow rate sections provided therein which can be easily manufactured from conventional equipment in use for other type filters with a minor modification thereof.

Another object of the present invention is to provide surface type full flow filter element which is provided with a by-pass flow section therethrough and a full flow section therein so that during cold starting the by-pass flow section will continue to permit oil to pass therethrough.

Another object of the present invention is to provide a surface type filter element provided with by-pass and full flow rate sections therein which increase the life span of the filter element while progressively filtering all of the oil passed therethrough to a high degree of efficiency.

Another object of the present invention is to provide a surface type full flow filter element having different flow rate sections as distinguished from a depth type or bulk type filter having a fibrous mass incorporated therein with its attendant problems of lower efficiency, non-uniformity and channeling.

Other objects and advantages of the present invention will be readily apparent from the following description when considered in connection with the accompanying drawing forming a part thereof and in which FIG. 1 is a diagrammatic view showing a method of providing different flow rate sections in filter paper.

Figure 1:
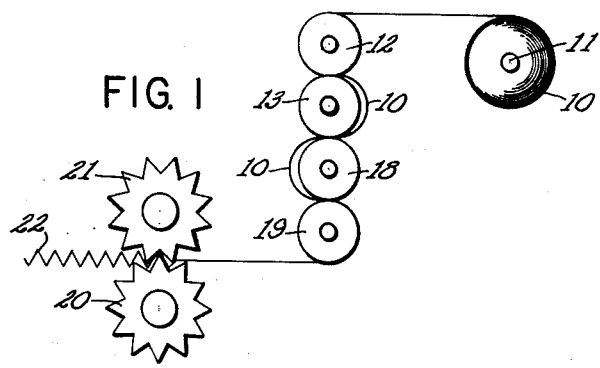
Figure 2:
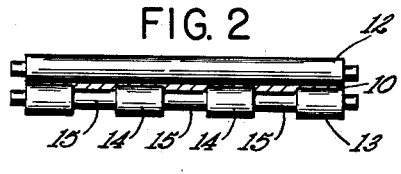
FIG. 2 is a transverse detail view of a pair of complementary rollers shown in FIG. 1.

Referring to FIG. 1, the reference numeral 10 designates a roll or spool of resin impregnated filter paper having a uniform porosity of 25 microns disposed on a mandrel 11. The paper is fed from the roll over and between a pair of engaging rollers 12 and 13 having the configurations illustrtated in FIG. 2. Roller 12 comprises a substantially cylindrical roller while its complementary roller 13 is provided with cylindrical sections 14 between which are disposed other cylindrically shaped sections 15 having smaller diameters than sections 14. When the filter paper is passed therebetween, alternate or spaced sections of the paper are compressed or densified thus forming a strip of filter paper having continuous ribs 16 between which are disposed continuous recesses extending the length of the paper. The spacing between rollers 12 and 13 is set or predetermined so that the portion of the paper passing adjacent roller sections 15 maintains its original porosity or density and comprises the full flow rate section of the filter paper while the portion of paper passing between roller sections 14 is densified or compressed to reduce its porosity to provide a by-pass or slow flow rate section. The paper is then fed between rollers 13 and 18 and thereafter passes between complementary rollers 18 and 19. Rollers 18 and 19 are identical in shape to the former roller set except that the recesses 17 formed in the paper by compression between the roller sets are progressively compressed therein to prevent any rupture or tearing of the paper. If desired, more roller sets for progressive compression of the paper may be employed. The compression sections of the rollers are spaced from their respective complementary roller so that the paper is densified or compressed to reduce the porosity of the paper in recesses 17 in two steps to a porosity of 10 micron size.

Figure 3:
FIG. 3 is a transverse sectional view of filter paper having different flow rate sections therein formed by the method illustrated in FIG. 1.

When the paper leaves roller 19, it has been formed into the transverse cross section shown in FIG. 3. The paper is then passed between a set of convoluting or pleating members 20 and 21 which convert the straight paper into a continuous series of pleats 22, as in FIG. 1. The convoluted paper is then cut into desired lengths and after the resin therein is cured in a heating furnace, which forms no part of the present invention, the paper is wrapped around a perforated metal center tube 23 and annular end caps 24 are cemented to the opposite ends of the filter pleats to provide a seal therefore. This results in the filter cartridge shown in FIG. 6.

Figure 6:
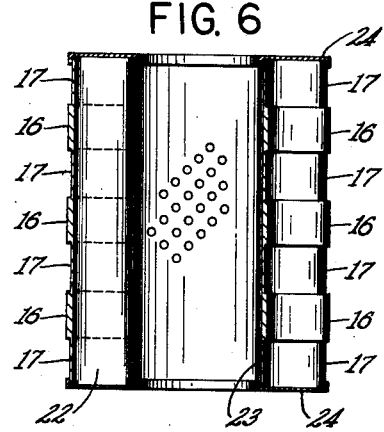
FIG. 6 is a view of a filter cartridge, partly in section, made with the filter paper of FIG. 3.
Figure 7:
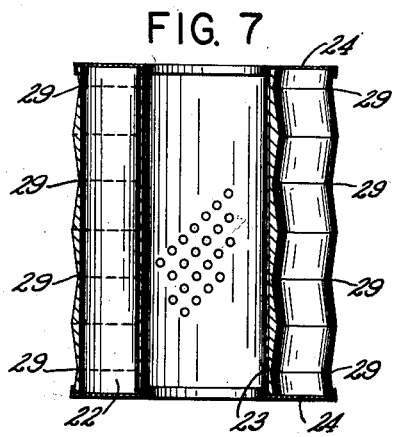
FIG. 7 is a view of a filter cartridge, partly in section, made with the filter paper of FIG. 5.
Figure 4:
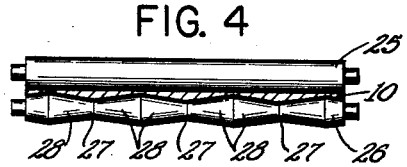
FIG. 4 is a transverse detail view of a pair of complementary rollers used in carrying out a modified method of the invention of FIG. 1.
Figure 5:
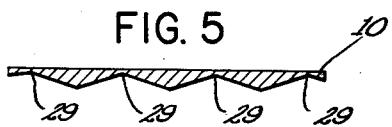
FIG. 5 is a transverse sectional view of the filter paper formed by the roller set of FIG. 4.

The embodiment of the invention shown in FIG. 7 is the same as that in FIG. 6, except that the complementary rollers 25 and 26 (see FIG. 4) used in carrying out the invention have a predetermined spacing therebetween to provide a filter paper having a density or porosity graduated from 10 to 25 microns. The surface of roller 26 has a series of V-shaped recesses 27 therein formed by oppositely disposed truncated cones 28 which compress or densify the strip of filter paper fed between the rollers to form similar V-shaped recesses or grooves 29 therein extending longitudinally of the filter paper, as shown in FIG. 5. This provides a filter paper having a pore size of 25 microns adjacent the top of the groove, progressively graduated in porosity along the groove side walls to the bottom thereof where the smallest porosity is 10 microns.

*Example*

In tests, SAE 30 oil (Essolube HD-30) with detergent additives at 180° F. was flowed through an annular resin impregnated pleated paper filter having 653 square inches of paper, pore size range 20–25 microns, dimensions 3½" O.D. by 4¾" long. The oil passed therethrough at 2.5 g.p.m., with contaminant known as SOFTC #2B introduced into the stream at the rate of 1.4 gms./hr. The test was run until the differential pressure across the filter was 8 p.s.i. The average dirt removal efficiency on a test of three such filter elements as 66.3%.

The identical test was run on three other similar filter elements except that 44.5% of the paper was compressed (average of three) to a tight pore size range of 10–20 microns. The dirt removal efficiency of these elements was 79.0% (average of three). Thus, from these results it is obvious that there was an increase in 19.2% in contaminant removal efficiency before the 8 p.s.i. differential pressure was reached without impairing the normal service life of these "two flow rate" filters.

Inasmuch as various changes may be made in the particular form and arrangement of the article and in the steps of the process and other sequences as disclosed without departing from the principles of the invention, it will be understood that the invention is not to be limited except by the scope of the appended claim.

What we claim is:

A paper filter having a high and a low flow rate section comprising a center tube, resin impregnated pleated filter paper disposed around said tube, end caps sealing off the opposite ends of the said paper, a predetermined area of said paper being compressed to form a thinner section of paper extending circumferentially around said tube to provide a low flow rate section therein, the remaining circumferentially extending portion of said paper providing a high flow rate section, whereby two filter elements having different filtering characteristics are formed into a single filter cartridge from a continuous sheet of paper, said fast flow rate section consisting of resin impregnated paper having a porosity of 25 microns and said slow flow rate section having a porosity of 10 microns and this slow flow rate section comprising approximately one-half of the total area of the paper.

References Cited in the file of this patent

UNITED STATES PATENTS

| | | |
|---|---|---|
| 2,321,985 | Briggs | June 15, 1943 |
| 2,395,449 | Briggs | Feb. 26, 1946 |
| 2,675,127 | Layte | Apr. 13, 1954 |
| 2,801,009 | Bowers | July 30, 1957 |

FOREIGN PATENTS

| | | |
|---|---|---|
| 725,066 | Great Britain | Mar. 2, 1955 |